US011944964B2

(12) United States Patent
Meacham et al.

(10) Patent No.: US 11,944,964 B2
(45) Date of Patent: Apr. 2, 2024

(54) MICRO-BIOELECTROCHEMICAL CELL DEVICES AND METHODS OF DETECTING ELECTRON FLOWS

(71) Applicants: John Mark Meacham, St. Louis, MO (US); Arpita Bose, St. Louis, MO (US); Michael M. Binkley, St. Louis, MO (US)

(72) Inventors: John Mark Meacham, St. Louis, MO (US); Arpita Bose, St. Louis, MO (US); Michael M. Binkley, St. Louis, MO (US)

(73) Assignee: Washington University, St. Louis, MO (US)

( * ) Notice: Subject to any disclaimer, the term of this patent is extended or adjusted under 35 U.S.C. 154(b) by 695 days.

(21) Appl. No.: 16/776,496

(22) Filed: Jan. 29, 2020

(65) Prior Publication Data

US 2020/0282396 A1 Sep. 10, 2020

Related U.S. Application Data

(60) Provisional application No. 62/798,001, filed on Jan. 29, 2019.

(51) Int. Cl.
*B01L 3/00* (2006.01)

(52) U.S. Cl.
CPC . *B01L 3/502715* (2013.01); *B01L 2300/0645* (2013.01); *B01L 2300/0861* (2013.01); *B01L 2300/12* (2013.01)

(58) Field of Classification Search
CPC ....... B01L 3/502715; B01L 2300/0645; B01L 2300/0861; B01L 2300/12; B01L 2300/0816; B01L 2300/087; B01L 3/5027
USPC .......................................................... 204/403.01
See application file for complete search history.

(56) References Cited

U.S. PATENT DOCUMENTS 7,476,363 B2 * 1/2009 Unger ............... B01L 3/502707 422/504
2011/0033869 A1 * 2/2011 Bertin ................ G01N 33/5438 435/7.1
2013/0313452 A1 * 11/2013 Tice .................... F16K 99/0051 251/129.01

* cited by examiner

*Primary Examiner* — Matthew D Krcha
*Assistant Examiner* — Jacqueline Brazin

(57) ABSTRACT

A micro-bioelectrochemical cell (μ-BEC) device is disclosed that includes from 4 to 96 microfluidically connected of chambers, in which each chamber encloses a volume of about 1 μL to 2 μL. A working electrode, reference electrode, and counting electrode contacts each volume. The μ-BEC device includes a support layer coated with a working electrode layer, a microfluidics layer containing a plurality of wells, and an electrical layer containing the reference and counter electrodes. Methods of using the μ-BEC device to perform bioelectrochemical measurements of cells are also disclosed.

16 Claims, 13 Drawing Sheets
(12 of 13 Drawing Sheet(s) Filed in Color)

(i) Top layer: Pt and Ag electrode pattern facing 96 reaction well
(ii) Middle layer: 96 reaction well
(iii) Bottom layer: ITO coated glass cover slip facing 96 reaction well

MICRO-BIOELECTROCHEMICAL CELL DEVICES AND METHODS OF DETECTING ELECTRON FLOWS

CROSS-REFERENCE TO RELATED APPLICATIONS

This application claims the benefit of U.S. Provisional Application No. 62/798,001 filed Jan. 29, 2019, the contents of which are incorporated by reference in its entirety.

STATEMENT REGARDING FEDERALLY SPONSORED RESEARCH OR DEVELOPMENT

This invention was made with government support under W911NF-18-1-0037 awarded by the Army Research Office (ARMY/ARO). The government has certain rights in the invention.

FIELD OF THE DISCLOSURE

The present disclosure generally relates to devices and methods for bioelectrical analyses of cells.

BACKGROUND OF THE DISCLOSURE

Microbial interactions with surfaces, especially via formation of biofilms, have important implications in bioenergy, biofouling, biofilm formation, and the infection of plants and animals. Despite this, current understanding of these interactions is remarkably incomplete. One influential property of any surface is its intrinsic charge, and electrostatic forces represent the earliest interactions of microbes with surfaces.

Systematic studies on the influence of charge on microbial interactions and microbial response to charged surfaces are lacking. Most current understanding about this process is derived from physicochemical studies on "hard or soft" colloidal particles, and new approaches are needed to advance the current understanding in this field. Although most natural surfaces and microbes carry a net negative charge, microbes readily interact with such surfaces and physicochemical studies suggest that extracellular organelles such as fimbriae, pili, curli and flagella aid in overcoming electrostatic destabilization.

Current devices and methods typically lack the ability to visualize processes associated with microbe interactions with charged surfaces at the microscopic level. Typically, most experiments are done in bulk reactors, and the overall process is monitored using overall electrochemical output and/or cell biomass/product increase. Microbial interactions with the charged materials are typically studied at the conclusion of the incubation via confocal and/or electron microscopy. In addition, currently existing methods lack high throughput capacity needed to compare different genetic mutant strains or physical/chemical/electrical conditions, or to obtain data sufficient to demonstrate statistical significance. Further, existing devices and methods are unable to facilitate confocal imaging and/or super-resolution imaging of live microbes needed to visualize the mechanisms of microbial interactions with charged surfaces.

Development of a microscopic, microfluidic, bioelectrochemical system compatible with bioimaging modalities, such as confocal imaging and/or super-resolution imaging of live microbes would advance the study of microbe interactions with charged surfaces at the individual microbe level.

Other objects and features will be in part apparent and in part pointed out hereinafter.

SUMMARY

In one aspect, a micro-bioelectrochemical cell (μ-BEC) device is provided that includes a plurality of chambers. Each chamber encloses a volume ranging from about 1 μL to about 1.6 μL. The device includes a support layer, a microfluidics layer, and an electrical layer. The support layer includes support contact surface and at least a portion of the contact surface is coated with a working electrode layer. The microfluidics layer includes opposed first and second surfaces and contains a plurality of microfluidically connected wells formed through this layer. The electrical layer includes an electrical contact layer as well as a plurality of counter electrodes and reference electrodes positioned on the electrical contact layer. The first surface is bonded to the support contact surface and the second surface is bonded to the electrical contact layer in alignment to form the plurality of chambers. Each chamber includes one well sealed between one portion of the working electrode layer and one portion of the electrical layer containing one counter electrode and one reference electrode. The one portion of the working electrode layer, the one counter electrode, and the one reference electrode are in electrical contact with the volume of the chamber.

In this aspect, the plurality of chambers may range from about 12 to about 96 chambers. The device may also include a plurality of microfluidic channels to microfluidically connect at least one group of the chambers. Each microfluidic channel may be formed in the second surface of the microfluidics layer or in the electrical contact surface of the electrical layer. Each microfluidic channel connects a first chamber with a second chamber.

The device may also include at least one microfluidic inlet and one microfluidic outlet formed in the second surface of the microfluidics layer or the electrical contact surface of the electrical layer. Each microfluidic inlet may be connected to at least one group of microfluidically coupled chambers, each microfluidic inlet may be connected to a receiving chamber of a group of microfluidically interconnected wells, and each microfluidic outlet may be connected to a delivering well of the group of microfluidically connected wells. Each microfluidic inlet may deliver fluids to the group of microfluidically connected wells and each microfluidic outlet may remove fluids from the group of microfluidically connected wells. The support layer may be formed from a material selected from glass, indium tin oxide, and any combination thereof. The working electrode layer may include a material selected from graphite and indium tin oxide (ITO). The working electrode layer may include a continuous ITO layer extending over all wells of the fluidic layer. Alternatively, the working electrode layer may include a plurality of ITO patches, and each ITO patch may overlap at least one well of the fluidic layer. The electrical layer may be formed from glass. The plurality of reference electrodes may be formed from Ag, AgCl, and any combination thereof. The plurality of counter electrodes may be formed from Pt. The plurality of reference electrodes and counter electrodes may be wires positioned within grooves formed within the electrical contact surface of the electrical layer. Alternatively, the plurality of reference electrodes and counter electrodes may be patterned metal deposited on the electrical contact surface of the electrical layer. Each reference electrode and counter electrode may contact a single chamber. Alternatively, each reference electrode and counter electrode may contact a group of chambers from the plurality of chambers. The microfluidics layer may include a material selected from glass, acetal polyoxymethylene (POM), and any combination thereof. The electrical layer, the support layer, and any combination thereof may be transparent for purposes of confocal fluorescence imaging, super-resolution imaging, and any combination thereof.

In another aspect, a method of detecting or measuring interactions of cells with an electrically charged surface is provided. The method includes providing a μ-BEC device that includes a plurality of chambers. The plurality of chambers includes at least one group of microfluidically connected chambers. Each chamber encloses a volume ranging from about 1 μL to about 1.6 μL. Each chamber includes a working electrode in contact with the volume, a counter electrode in contact with the volume and a reference electrode in contact with the volume. The method further includes introducing a plurality of cells into the plurality of chambers to attach a portion of the plurality of cells to each working electrode, and measuring electron flow or current density within each chamber.

The method may also include imaging the portions of cells attached to each working electrode using confocal fluorescence imaging, super-resolution imaging, and any combination thereof. The method may also include measuring electron flow or current density within each chamber may further include measuring extracellular electron transfer (EET), extracellular electron uptake (EEU), and any combination thereof. The method may also include varying conditions within individual chambers. The conditions are selected from light, flow velocity, temperature, pH, chemical promoters, chemical inhibitors, and any combination thereof.

Other objects and features will be in part apparent and in part pointed out hereinafter.

DESCRIPTION OF THE DRAWINGS

The patent or application file contains at least one drawing executed in color. Copies of this patent or patent application publication with color drawing(s) will be provided by the Office upon request and payment of the necessary fee.

The following drawings illustrate various aspects of the disclosure. Those of skill in the art will understand that the drawings, described below, are for illustrative purposes only. The drawings are not intended to limit the scope of the present teachings in any way.

Figure 1A:
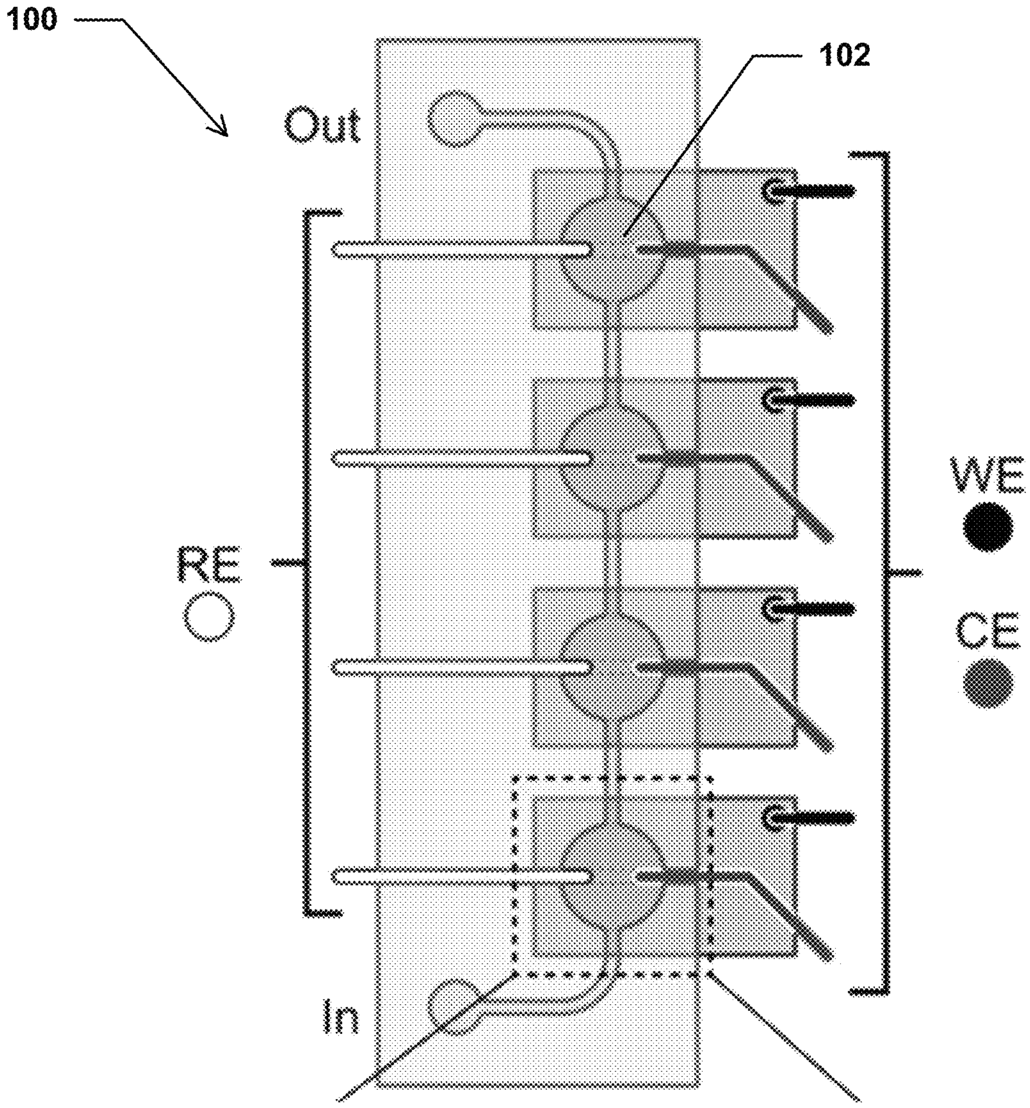
FIG. 1A is a schematic drawing of a single, four-chamber micro-bioelectrochemical cell (μ-BEC) with indium tin oxide (ITO) working electrodes (WE), silver reference electrodes (RE), and platinum counter electrodes (CE) in accordance with one aspect of the disclosure.

There are shown in the drawings arrangements that are presently discussed, it being understood, however, that the present embodiments are not limited to the precise arrangements and are instrumentalities shown. While multiple embodiments are disclosed, still other embodiments of the present disclosure will become apparent to those skilled in the art from the following detailed description, which shows and describes illustrative aspects of the disclosure. As will be realized, the invention is capable of modifications in various aspects, all without departing from the spirit and scope of the present disclosure. Accordingly, the drawings and detailed description are to be regarded as illustrative in nature and not restrictive.

DETAILED DESCRIPTION

The present disclosure is based, at least in part, on the design and implementation of a device or platform that can be used in high-throughput electrochemical, imaging, and spectrometric analyses of microbial cells and communities. In various aspects, a micro-bioelectrochemical cell (μ-BEC) is disclosed that is amenable to high-throughput investigation of such phenomena using the ubiquitous 96-well plate format and associated automation and assessment tools (e.g., plate readers) while maintaining compatibility with confocal microscopy for high-resolution (including potentially super resolution) microscopy of sub-cellular processes (e.g., electron uptake dynamics), as well as other post-treatment analyses (e.g., secondary ion mass spectrometry (SIMS)).

In various aspects, the μ-BEC includes a plurality of microfluidically connected chambers. Each chamber encloses a small volume ranging from about 1 μL and about 2 μL per chamber. The number of chambers included in the μ-BEC range from about 3 chambers and about 96 chambers. Individual chambers of the μ-BEC in some aspects can be arrayed to allow multiple well-specific conditions (electrical, chemical, cellular, etc.) to be evaluated simultaneously. Each chamber further contains a working electrode, a reference electrode, and a counting electrode to facilitate a variety of electrochemical measurements within each chamber.

Figure 1B:
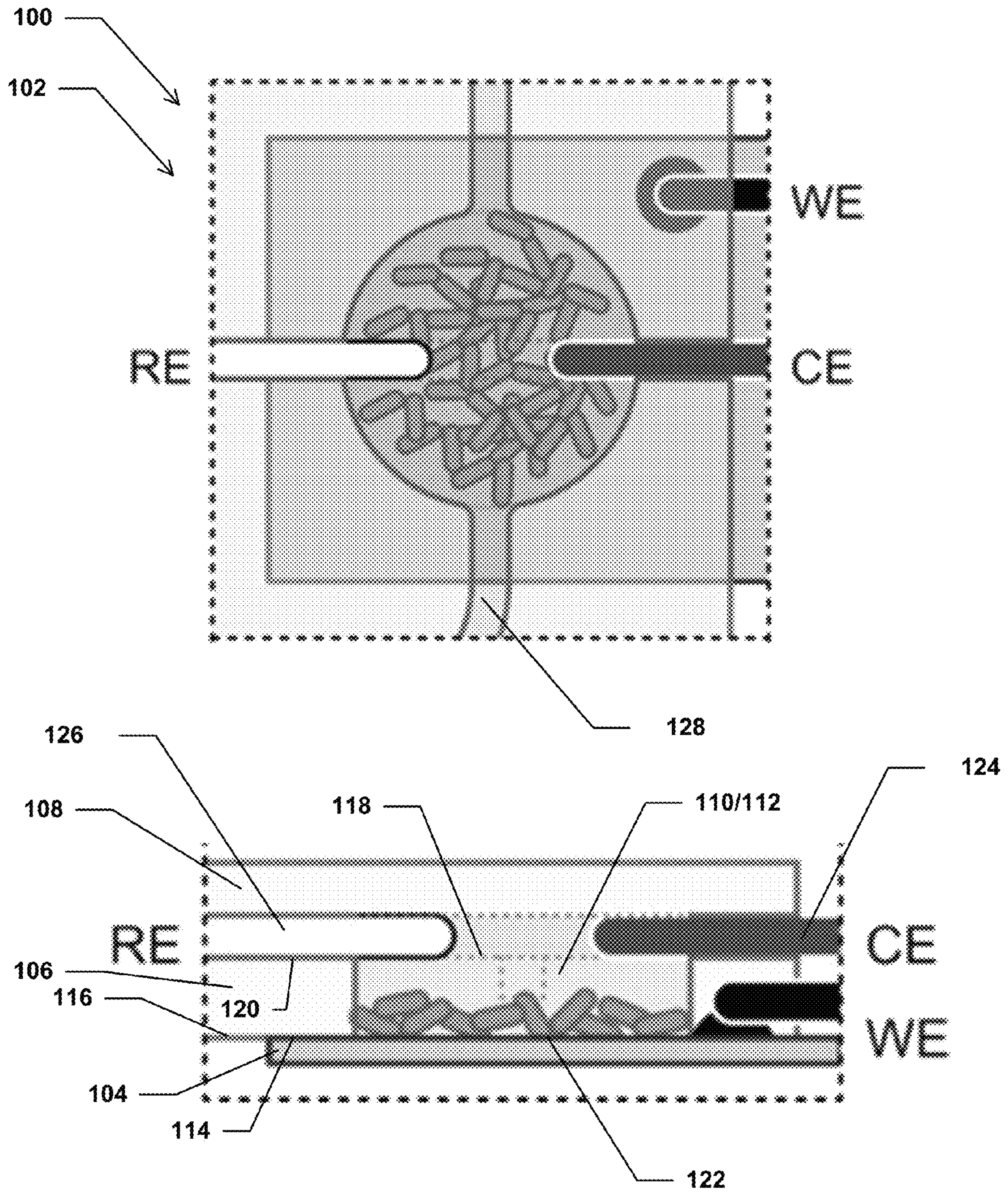
FIG. 1B is an enlargement of one chamber of the μ-BEC denoted as a dashed rectangular region in FIG. 1A, showing microbial cells attached to the indium tin oxide (ITO) working electrode (WE).

In one aspect, a μ-BEC device 100 with a plurality of microfluidically connected chambers 102 is illustrated in FIG. 1A. As illustrated in FIG. 1B, each chamber 102 includes a support layer 104, a microfluidics layer 106, and an electrical layer 108. Each chamber encloses a volume 110. The chamber 102 includes a well 112 formed within the microfluidics layer 106 and passing therethrough. The well 112 is sealed by a support contact surface 114 of the support layer 104, which is bonded to a first surface 116 of the microfluidics layer 106. The well 112 is further sealed by the electrical contact surface 118 of the electrical layer 106, which is bonded to a second surface 120 of the microfluidics layer 106.

Referring again to FIG. 2A, each chamber 102 further includes a working electrode (WE) 122, a counting electrode CE 124 and a reference electrode (RE) 126, all of which are in electrical contact with the volume 112 enclosed within the chamber 102.

In various aspects, at least a portion of the support surface 114 is coated with a working electrode layer to form the working electrode 122. Any suitable working electrode material may be used to form the working electrode 122 including, but not limited to, graphite and indium tin oxide (ITO). In some aspects, the working electrode layer is deposited on a region of the support surface 114 aligned with one well 112. In other aspects, regions of the support surface 114 aligned beneath 2 or more wells 112. In yet other aspects, the entire support surface 114 is coated with a working electrode layer so that the entire support surface 114 acts as a working electrode 122 for all chambers 102 of the device 100.

In various aspects, microfluidics layer 106 of the μ-BEC device 100 further includes a plurality of microfluidic channels 128 formed within the second surface 120 of the microfluidics layer 106. In various aspects, each microfluidic channel may connect one chamber to another chamber, may connect a chamber to a fluid source including, but not limited to, a microfluidic pump, or may connect to a microfluidic outlet to remove fluid from the chamber.

Referring again to FIG. 1A and 1B, the μ-BEC can comprise polymer fluidic layers, indium tin oxide (ITO) coverslips, and a glass layer with integrated reference electrodes (REs) and counter electrodes (CEs). Inlet, outlet, and connecting channels can be laser cut into an acetal polyoxymethylene (POM) adhesive tape. Reaction chambers (e.g., wells of about 4 mm in diameter) can be cut into a second acetal POM tape, which can be aligned and bonded to the channel layer using a pressure-sensitive acrylic adhesive. Prior to assembly, inlet/outlet holes (e.g., about 1 mm diameter) can be drilled into a glass capping layer (e.g., 1.75 mm thick). Deep grooves (e.g., 500 μm) can be diced into the glass above the chamber midlines to place 250 μm silver and platinum wires used for reference (RE) and counter (CE) electrodes, respectively. Each well (e.g., a 1.2 μL it well) can be enclosed by an ITO-coated coverslip (e.g., 6 mm×10 mm×170 μm thick, 30-60Ω) that serves as the working electrode (WE). Inlet and outlet tubes can be attached on the glass capping layer and the tube ends can be capped with male/female luer lock fittings.

This technology can be useful for many applications involving both live cells and materials that require bioelectrochemical output data. For example, the charge tunability of the device can make it useful for live cell or charge particle attachment/detachment. As another example, the device can be combined with many downstream assays such as live imaging and collection of live cell material for genomics. As another example, the device can be compatible with confocal fluorescence imaging, super-resolution imaging, and secondary ion mass spectrometry (SIMS). As another example, the device can be used to create designer materials using DNA origami or polymers. As another example, the device can be useful for the emerging field of bioelectronics. As another example, microbial biofilms can be assembled and disassembled on demand using this device. As another example, the device can be used for human cell biology as a nanomaterials-testing platform. As another example, the device can be used for the development of a biosensor using designer microbes.

In various other aspects, a μ-BEC device with 3 microfluidic electrochemical chambers that can be poised at a standard range of potentials is illustrated in FIG. 21. This device is compatible with both confocal and super-resolution imaging systems. The μ-BEC device was constructed by stacking a pre-channeled microscopic glass slide over on an indium tin oxide (ITO) coated cover slip (glass slide/channeled glass slide/ITO glass cover slip) as shown in FIG. 21. ITO is conductive yet transparent for purposes of imaging. The bottom portion of the stack is the working electrode, which is the conductive ITO coated cover slip (170 μm thick, ~30Ω). The middle portion is the size of a standard microscopic slide (7.5 cm×2.5 cm) constructed by using a standard soft lithography method, followed by a wet etching procedure to create bioelectrochemical reaction wells. The top portion of the stack is a microscopic slide (7.5 cm×2.5 cm), which was used to mount a counter electrode and reference electrode perpendicularly to the reaction well (25-50 μL) in order to create a three-electrode set up with the working electrode (cover slip) as the bottom layer. In various aspects, cells passively attach to the ITO surface in the absence of current, but when current is introduced into the chamber, cell attachment increases dramatically.

In various additional aspects, a 96-well μ-BEC device is illustrated in FIGS. 22, 23, 24, 25, and 26. The μ-BEC device in these aspects is compatible with bioimaging such as standard fluorescence, confocal microscopy, and super-resolution microscopy.

The 96-well format microfluidic electrochemical device (96-well EC) is designed similarly to the microfluidic electrochemical devices illustrated in FIGS. 1A, 1B, and 21 and described above, with the three-electrode configuration (working, counter and pseudo-reference electrodes). A thin film of counter and reference electrode pattern is used in the 96-well EC instead of inserting wire electrodes as done in the device of FIG. 21. FIG. 23 shows the microfabrication of the 96-well EC using three glass slides: a top (electrical) layer, middle (microfluidics) layer, and bottom (support) layer). As shown in FIG. 23, the microfluidically-connected channels with 96-wells on a glass cover slip (spacer or middle layer, thickness: 200 μm) is stacked between the top and bottom glass stack. The bottom stack of the glass cover slip (170 μm) consists of transparent conductive ITO coated spots (area: 7 $mm^2$) as working electrodes, which face toward the reaction well. Each working electrode spot (Indium tin oxide, ITO spot) is electrically connected to their respective busbar. The counter and pseudo-reference electrodes are patterned on the top glass slide (1 mm thick) as shown in FIG. 22. A micron thick film of Silver (Ag, pseudo-reference electrode) is deposited on the top glass layer followed by the deposition of a micron thick Platinum film (Pt, counter electrode) using standard lithography etching technique with the help of positive and negative photoresists. Each counter electrode is electrically connected to their busbar, and each reference electrode is be electrically connected to their reference electrode busbar as shown FIG. 22. AutoCAD software may be used to design the mask pattern for the photoresist-etching. The metal deposition (Ag or Pt) may be done in a plasma-enhanced chemical vapor deposition (PECVD) system. The electrode thickness or channel etches may be measured using a Profilometer (KLA-Tencor Alpha-Step D-100).

Once the electrode and 96-well patterns are made, glass to glass bonding may be performed to assemble the microfluidic electrochemical device. Bonding of two glass slides of microfluidic stacks (glass-glass) be achieved by simple chemical functionalization (Si-OH) and thermal fusion. In this method, the designed glass faces are thoroughly prewashed with acetone, gently scrubbed with detergent (1% Alconox), followed by deionized (DI) water to remove oil or debris on the surface. A drop of the milky slurry with 0.5% Alconox and 0.5% calcium hydrate is trapped between the two glass faces, and gently rinsed with DI to get rid of excess milky suspension between the glass faces. Then the hydroxyl functionalized glass slides are clamped with a binder clip, and thermally fused at 110° C. for 2 h. The bonding of the glass stacks will be tested using a continuous flow of DI water in each channel. The stacks will then be air dried at room temperature to achieve the high bonding yield.

Pseudo-reference electrode and counter electrode will be patterned on glass plates (1 mm thick). The middle layer will be a glass cover slip (200 μm thick) with 96 wells for microbe-electrode interface (each well volume ~7 μL), Bottom layer will be a ITO coated glass coverslip (170 μm).

The 96-well device may include 8 microfluidically connected distinct channels with 12 compartments each, where each compartment or channel can be controlled individually for chronoamperometry.

Macroscale approaches to measuring EEU or EET in cells exist, but the novelty disclosed herein is the approach to multiplexing that allows many measurements to be taken at once. The disclosed device does not simply expand this approach to four chambers (or four "bottles" with CE, RE, and WE), but allows for simultaneous measurement (including optical, which is not possible in other formats) of multiple samples that may or may not be interconnected by fluidic lines that allow for removal of planktonic cells during measurements. The disclosed integrated device also allows for more complicated electrical control/measurement than simply performing several conventional measurements in parallel. It is presently believed that known designs and systems are not well-suited to this type of multiplexing as the disclosed microfabricated/microfluidic system is.

As described herein, the device or system can overcome challenges with the current technology such as the inability to visualize these processes at the microscopic level. Most experiments are performed in bulk reactors, and the overall process is monitored as such with the output as electrochemical data and/or cell biomass/product increase. Microbial interactions with the charged materials are studied at the conclusion of the incubation via confocal and/or electron microscopy. Here we describe the development of microscopic bioelectrochemical reactors that are compatible with various relevant imaging platforms necessary for advancing the field.

Another major challenge the disclosed devices and systems can overcome include the lack of throughput in bioelectrochemical studies. Bulk studies can be multiplexed to up to 8 reactors at a time, in most cases, based on available electrochemical equipment from commercial vendors. This is numerically insufficient for statistically significant biological replication, especially when comparing genetic mutant strains. Thus, here is provided a high throughput bioelectrochemical system in the field of electromicrobiology.

Described herein is the development of a microscopic, microfluidic, bioelectrochemical system compatible with bio-imaging to address both of the above challenges simultaneously, and represents a major advance in the current technology available to a variety of researchers from numerous fields.

The disclosed device is a 96-well device compatible with bioimaging such as standard fluorescence, confocal microscopy, and super-resolution microscopy. It has been demonstrated that the device works with standard and confocal fluorescence imaging.

In brief, conventional devices or systems lack the throughput component of and the compatibility with imaging technology of the disclosed technology.

Figure 9:
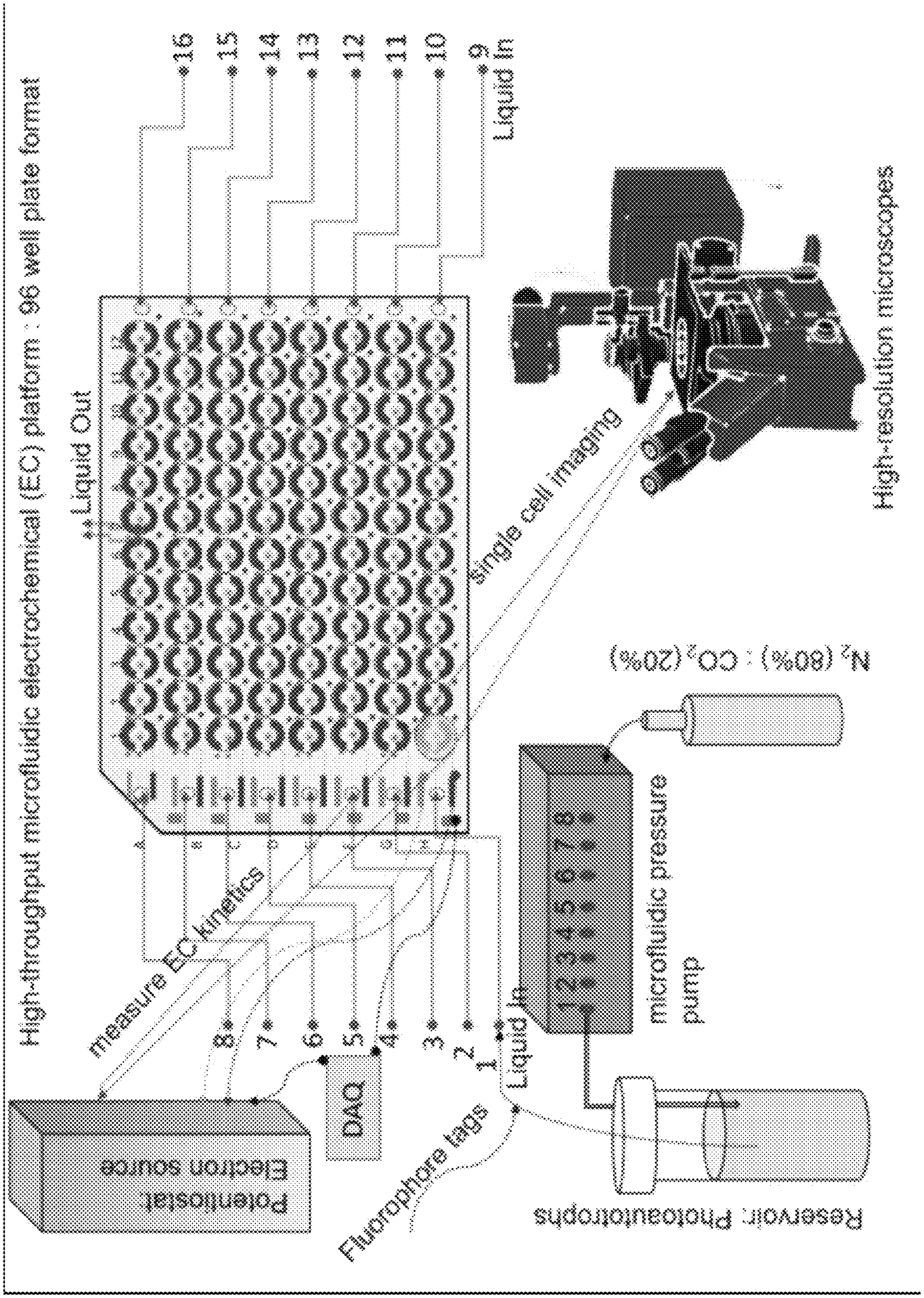
FIG. 9 is a schematic diagram of a high-throughput microfluidic electrochemical cell platform integrated with electrochemical measurements and optical imaging for single cells.

In various aspects, the μ-BEC device is incorporated into a high-throughput microfluidic electrochemical cell platform integrated with electrochemical measurements and optical imaging for single cells, as illustrated in FIG. 9.

The disclosed applications include microbe-charged surface interactions. However, such a technology can have many applications such as in cell culture, neurobiology, microbial pathogenesis, or a platform for sequencing, for instance.

In various aspects, the disclosed μ-BEC device may be used to assess bioelectrochemical processes of microbial communities or mixed populations. In addition, the disclosed μ-BEC device may be used to trap a variety of different kinds of cells, both microbial and eukaryotic, using electrostatic forces, due to the tenability of the working electrode of the device over a wide range of potentials from positive to negative.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein. The recitation of discrete values is understood to include ranges between each value.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

Any publications, patents, patent applications, and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

EXAMPLES

The following non-limiting examples are provided to further illustrate the present disclosure. It should be appreciated by those of skill in the art that the techniques disclosed in the examples that follow represent approaches the inventors have found function well in the practice of the present disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the present disclosure.

Example 1: Devices and Methods for Bioelectrochemical Investigation of Microbes This example describes a device or platform and associated methods of use for high-throughput electrochemical, imaging, and spectrometric analyses of microbial cells and communities. Microbes that exchange electrons with solid-phase conductive material via extracellular electron transfer (EET) play an important role in the biogeochemical cycling of iron, manganese, and other trace metals in nature. Study of EET (including extracellular electron uptake, EEU) also has implications for commercial applications including microbial electrosynthesis of industrially relevant products, among others.

It is difficult and tedious to investigate the path of electron transfer after EEU using conventional macroscopic (bulk) electrochemical techniques. Thus, to elucidate the path of electrons from solid electron donors, we have invented, fabricated, and demonstrated a micro-bioelectrochemical cell (μ-BEC) that is amenable to high-throughput investigation of such phenomena using the ubiquitous 96-well plate format and associated automation and assessment tools (e.g., plate readers) while maintaining compatibility with confocal microscopy for high-resolution (including potentially super resolution) microscopy of sub-cellular processes (e.g., electron uptake dynamics), as well as other post-treatment analyses (e.g., secondary ion mass spectrometry (SIMS)).

An initial prototype μ-BEC is a four-chamber, three-electrode (in each chamber), small-volume (~1 μl per well) electrochemical device. Individual chambers are arrayed to allow multiple well-specific conditions (electrical, chemical, cellular, etc.) to be evaluated simultaneously. The demonstration prototype comprises polymer fluidic layers, indium tin oxide (ITO) coverslips, and a glass layer with integrated reference and counter electrodes. Inlet, outlet, and connecting channels are laser cut into a 40 mm×12.25 mm×254 μm thick acetal polyoxymethylene (POM) adhesive tape. Four 4 mm diameter reaction chambers are cut into a second 127

μm thick acetal POM tape, which is aligned and bonded to the channel layer using a pressure-sensitive acrylic adhesive. Prior to assembly, 1 mm diameter inlet/outlet holes are drilled into a 1.75 mm thick glass capping layer. 500 μm deep grooves are diced into the glass above the chamber midlines to locate 250 μm silver and platinum wires used for reference (RE) and counter (CE) electrodes, respectively. Each 1.2 μl well is enclosed by a 6 mm×10 mm×170 μm thick ITO-coated coverslip (30-60Ω) that serves as the working electrode. Inlet and outlet tubes are attached on the glass capping layer and the 1/16" tube ends are capped with male/female luer lock fittings.

To demonstrate unique capabilities of the platform, the four-chamber μ-BEC array was used to monitor electron uptake dynamics in response to chemical inhibition of the photosynthetic electron transport chain (photosynthetic ETC) in the anoxygenic phototrophic bacterium Rhodopseudomonas palustris TIE-1. This is a model organism for EEU. Microbial samples were injected into the μ-BEC using a microflow controller with 50 mbar 80%-20% N2-CO2. Microbial cells were incubated in μ-BECs with working electrodes poised at +100 mV vs. Standard Hydrogen Electrode (SHE) for ~120 h under illuminated conditions with a single 60 W incandescent light bulb prior to beginning electron transport chain inhibitor experiments. Light "on-off" experiments were carried out at an interval of 10 s for a total of 200 s. Results from inhibitor studies have elucidated various aspects of the electron transfer path (see attached draft manuscript), validating the capabilities of the μ-BEC for such studies. Note that a major advantage of the μ-BEC platform is that it allows study of surface-attached cells exclusively because planktonic cells are easily washed out using the microfluidic system.

In addition to the prototype μ-BEC described above, we have devised a number of features/components needed to realize the proposed 96-well plate-based μ-BEC array. These include electrode configurations and device assemblies comprising various microfabricated device layers, which can be easily translated into a cost-effective system that is well-suited to high-volume manufacturing. Given the flexibility of the platform to expose microbes in different wells to differing electrochemical conditions (and potentially different fluidic conditions including chemical species, pH, flow velocities, etc.), we anticipate broader application of such a platform to allow researchers to answer other bioelectrochemical questions. In addition, because most cells are charged, this device can be adapted to attach and detach mammalian and plant cells to surfaces, while also being able to image them and also study other aspects of their biology. The bioelectrochemical measurements would be valuable to neurobiologists for instance.

The μ-BECs were assembled from polymer fluidic layers, indium tin oxide (ITO) coverslips, and a glass layer with integrated reference and counter electrodes. Inlet, outlet, and connecting channels were laser cut into a 40 mm×12.25 mm×254-μm thick acetal polyoxymethylene (POM) adhesive tape. Four 4 mm diameter reaction chambers were cut into a second 127-μm thick acetal POM tape, aligned, and bonded to the channel layer using a pressure-sensitive acrylic adhesive. Prior to assembly, 1-mm diameter inlet/outlet holes were drilled into Borofloat® 33 1.75-mm thick glass capping layer (Schott AG, Mianz, Germany). 500-μm deep grooves were diced into the glass above the chamber midlines to locate 250-μm silver and platinum wires used for reference (RE) and counter (CE) electrodes, respectively (Xi'an Yima Opto-electrical Technology Co., Ltd, Shaanxi, China). Each 1.6 μL (0.125 cm2) well was enclosed by a 6 mm×10 mm×170-μm thick ITO-coated coverslip (30-60Ω) (SPI supplies, West Chester, Pa.) to serve as the working electrode. Inlet and outlet tubes (Saint-Gobain TYGON® b-44-3; 1/16" ID×1/8" OD) (United States Plastic Corp., Lima, Ohio) were attached on the glass capping layer and the 1/16" tube ends were capped with male/female luer lock fittings (World Precision Instruments, Sarasota, Fla.). Microbial samples were injected into the μ-BEC using a FLOW EZ™ Fluigent Microflow Controller (Le Kremlin-Bicêtre, France) with 5 kPa 80%-20% N2-CO2. Microbial cells were incubated in μ-BECs with working electrodes poised at +100 mV vs. SHE for ~120 h under illuminated conditions with a single 60 W incandescent light bulb at a distance of 25 cm to establish biofilms. Once we obtained stable current densities under illuminated conditions (~−100 nA cm−2), planktonic cells were washed out of the system with microfluidic control and biofilms were immedietly treated with chemical inhibitors under dark conditions. Light "on-off" experiments were subsequently carried out at an interval of 10 seconds for a total of 200 seconds. Microfluidic flow was not applied during electrochemical data collection.

Figure 1C:
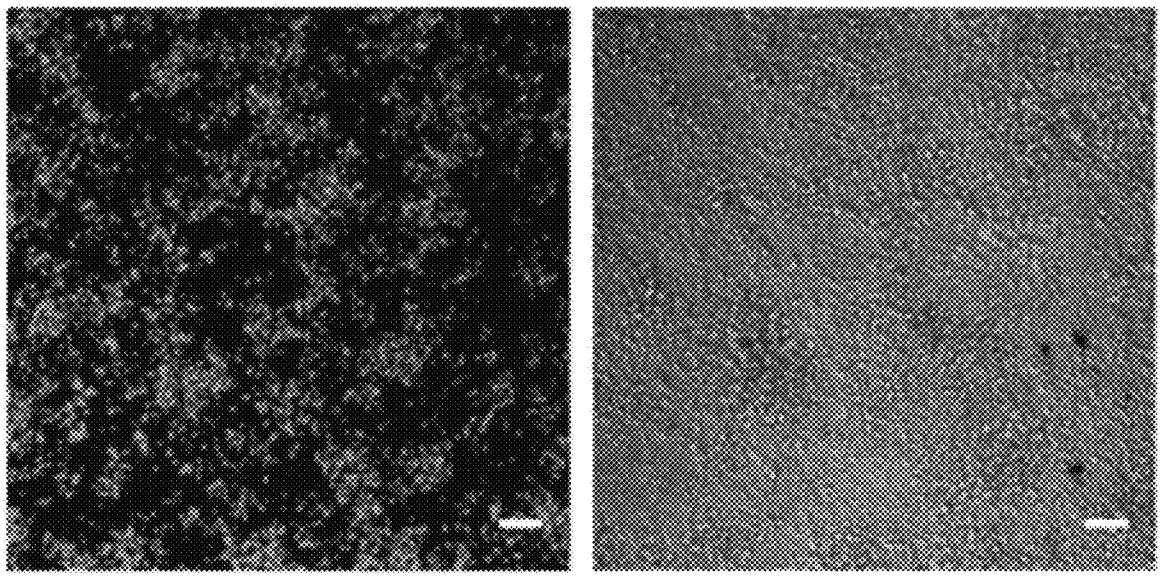
FIG. 1C contains a confocal micrograph of *R. palustris* TIE-1 biofilms attached to the WE of FIG. 1A under poised conditions using LIVE/DEAD® staining in which green cells are viable; scale bars are 10 μm.

The μ-BEC device used in this experiment is a four-chamber, three-electrode, small-volume (1.6 μL per well) BES that is compatible with confocal microscopy (FIG. 1*a*), as described above. Its major advantage is that it allows us to study surface-attached cells exclusively as planktonic cells can be washed out with microfluidic control (FIG. 1*b*). Appropriately grown microbial cells were incubated in μ-BECs for ~120 h at +100 mV vs. Standard Hydrogen Electrode (SHE) under continuous illumination. Once we obtained stable current densities under illuminated conditions (~−100 nA cm−2), planktonic cells were washed out of the system with microfluidic control. Medium flow was turned off following this wash because constant flow led to excessive noise in the electrochemical data. To determine that we only had surface-attached cells and no plankton, we performed confocal fluorescence microscopy with LIVE/DEAD□ staining in the intact μ-BEC. We observed surface-attached cells in single-layer biofilms (FIG. 1*c*). Previous studies have shown that EEU-capable microbes, including TIE-1, make single-layer biofilms on electrodes. Furthermore, we were unable to detect the presence of any motile planktonic cells in the μ-BEC.

Figure 1D:
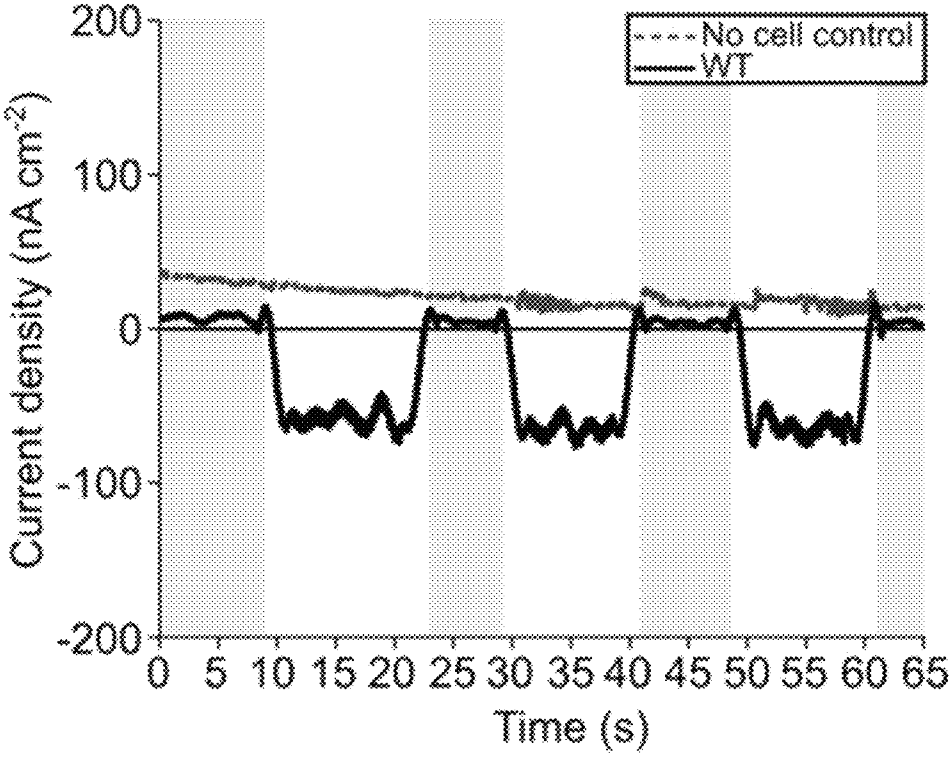
FIG. 1D is a graph summarizing representative current density measurements using the μ-BEC of FIG. 1A for TIE-1 wild-type (WT) (black) in the μ-BEC under illuminated and dark conditions (shaded regions) compared to a 'no cell control' reactor (red).

We used the above approach to obtain surface-attached cells in the μ-BEC and used these biofilms to study the influence of light and chemical inhibitors on EEU. Confocal imaging using LIVE/DEAD® staining was performed in the intact μ-BEC after these tests that typically lasted for a few minutes. We observed light-stimulated EEU by pre-established wild-type (WT) TIE-1 biofilms (FIG. 1*d*). Upon illumination, biofilms reached stable current densities within ~1-2 seconds and typically reached a maximum of ~−100 nA cm−2. Overall, the μ-BEC replicates the biofilm architecture reported in bulkier systems and permits reproducible measurements of EEU by surface-attached cells.

Figure 2A:
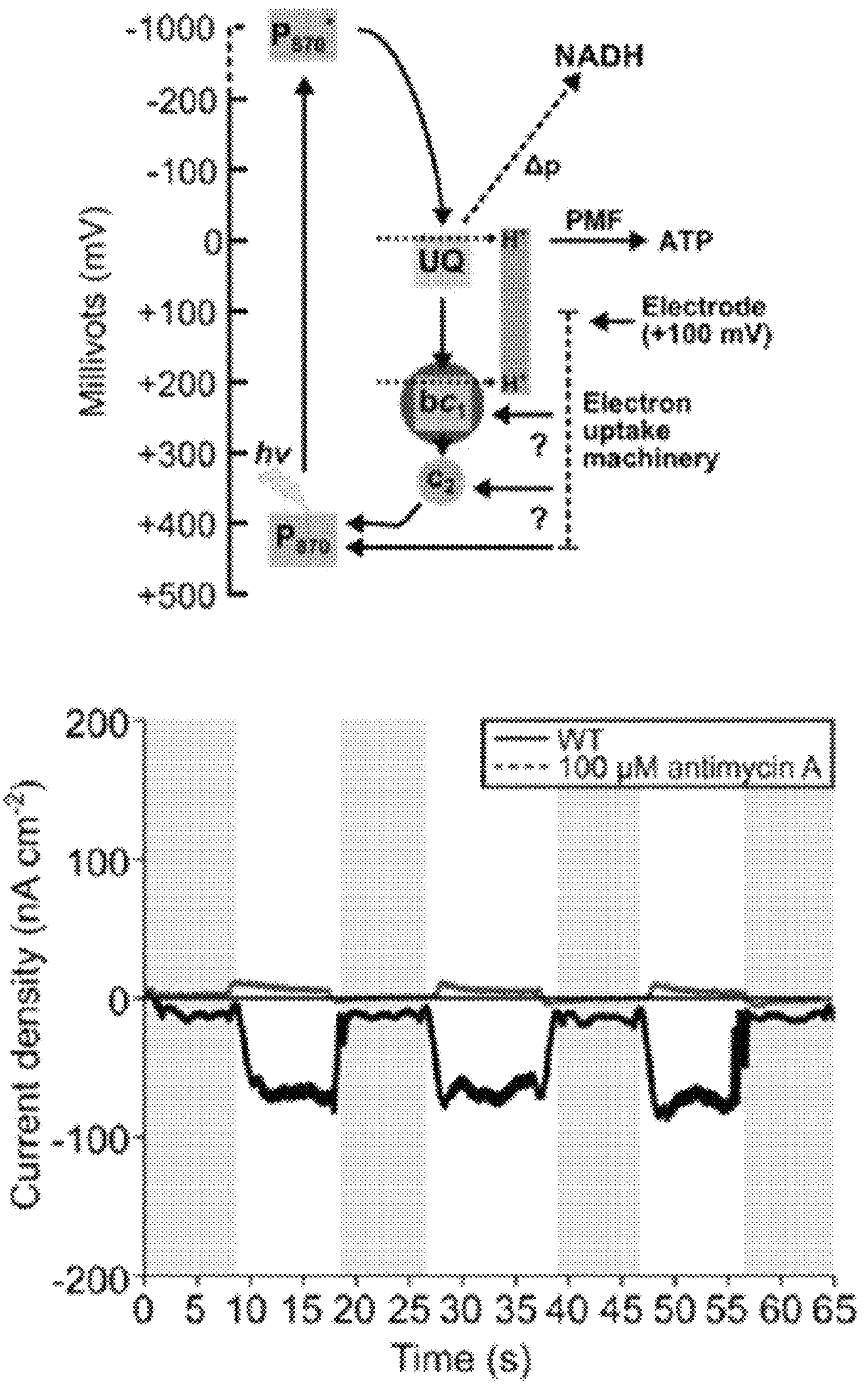
FIG. 2A is a schematic diagram (top) illustrating a proposed path of electron flow (top) and a graph (bottom) summarizing representative current density measurements of TIE-1 wild-type (WT) in response to inhibition of the photosynthetic ETC under illuminated and dark (shaded regions) conditions with and without antimycin A. The site of chemical inhibition is indicated by a red halo on the electron path diagrams. Annotations on the top schematic diagram include: $P_{870}$ (photosystem), $P_{870}$* (excited photosystem), UQ (ubiquinone), $bc_1$ (cytochrome $bc_1$), $c_2$ (cytochrome $c_2$), NADH-DH (NADH dehydrogenase), Δp (proton gradient), $H^+$ (protons), hv (light), ? (currently unknown), PMF (proton motive force) and ATP (adenosinetriphosphate).

To better understand electron flow during EEU we pursued a chemical probe-based approach to selectively inhibit key proteins involved in cyclic pETC. TIE-1 and related anoxygenic phototrophs use cyclic photosynthesis30 to generate energy. The photosystem (P870) is reported to be at the potential of +450 mV. Quinones reduced by the photosynthetic reaction center (P870*) donate electrons to the proton-translocating cytochrome bc1. Electrons are then transferred to cytochrome c2, and cycled back to the reaction center. To test whether cytochrome bc1 is involved in EEU, we used antimycin A, a specific inhibitor of cytochrome bc1 to block cyclic pETC (FIG. 2*a*). Antimycin A is a quinone analog that blocks the Qi site of cytochrome bc1, inhibiting electron transfer from ubiquinol to cytochrome b, thus disrupting the proton motive Q cycle. We observed a decrease in current uptake with antimycin A treatment (FIG. 2*a*). Current density became anodic (positive current) under phototrophic conditions (12.46±1.34 nA cm−2; P<0.0001) relative to untreated controls (−85.5±5.42 nA cm−2) but reverted to cathodic (negative current) densities under dark conditions (−3.46±1.80 nA cm−2; P=0.0006) (FIG. 2*a*). Importantly, we did not observe a difference in the number of live/dead cells attached to electrodes in inhibitor treated vs. untreated control reactors (Supplementary FIG. 2). These data suggest that electrons enter the pETC and that cytochrome bc1 is involved in electron flow during EEU.

Figure 2B:
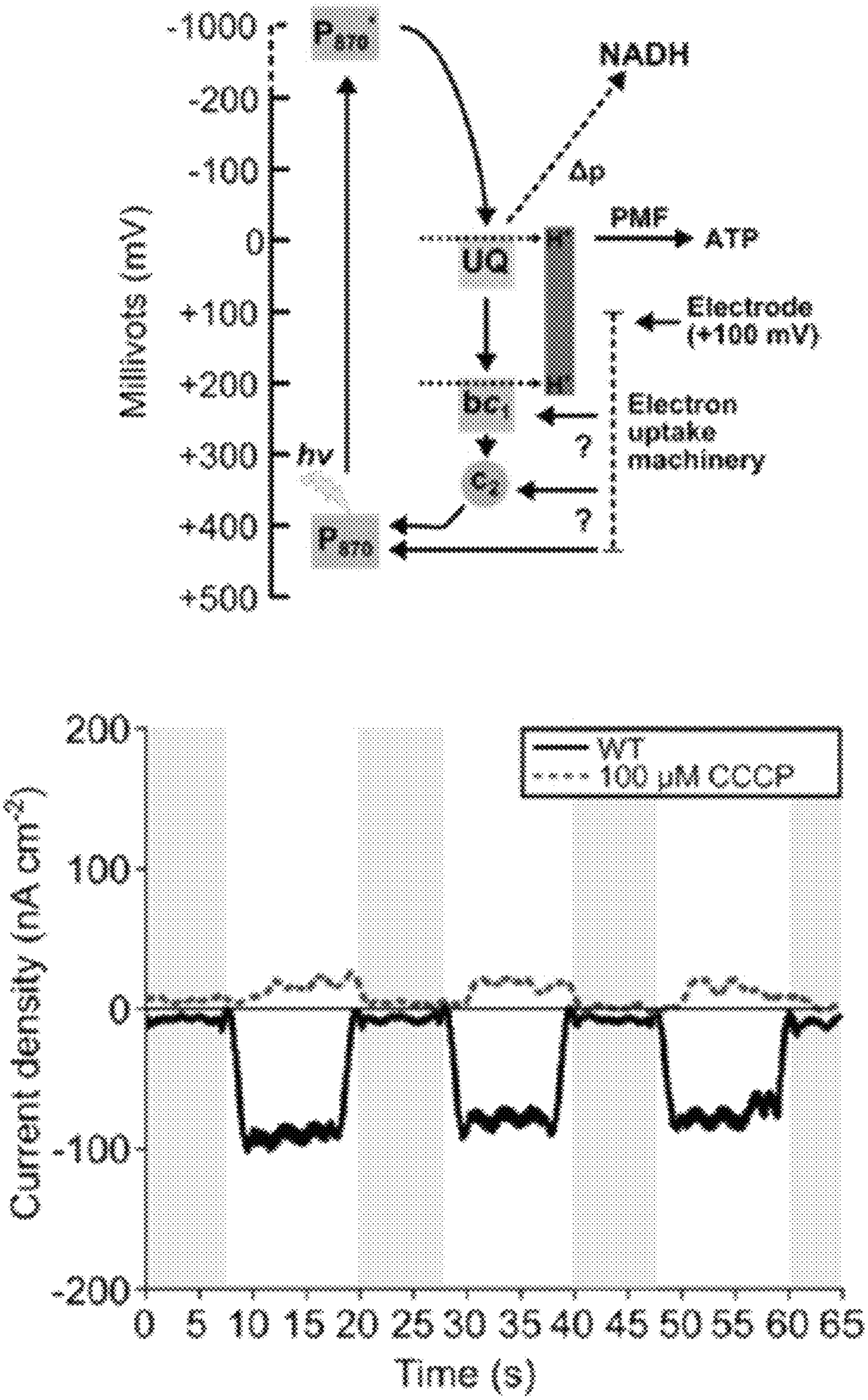
FIG. 2B is a schematic diagram (top) illustrating a proposed path of electron flow (top) and a graph (bottom) summarizing representative current density measurements of TIE-1 wild-type (WT) in response to inhibition of the photosynthetic ETC under illuminated and dark (shaded regions) conditions with and without carbonyl cyanide m-chlorophenyl hydrazine (CCCP). The schematic diagram is annotated similarly to the diagram of FIG. 2A.

Cyclic electron flow by the pETC is important for the establishment of a proton motive force (PMF) that drives ATP production. To investigate whether a proton gradient is important for EEU, we exposed TIE-1 biofilms to the protonophore carbonyl cyanide m-chlorophenyl hydrazone (CCCP) (FIG. 2*b*). CCCP is a lipid-soluble molecule that dissipates the PMF such that electron transfer is uncoupled from ATP synthesis. We observed a decrease in current uptake heading toward anodic current under illuminated conditions upon CCCP treatment (21.2±9.13 nA $cm^{-2}$; P<0.0001) compared to untreated controls (−113.5±21.7 nA $cm^{-2}$) (FIG. 2*b*). Current uptake was not different between CCCP (−18.4±14.0 nA $cm^{-2}$; P=0.8666) and untreated controls (−17.52±3.41 nA $cm^{-2}$) under dark conditions (FIG. 2*b*). These results demonstrate that a PMF is required for EEU. Furthermore, dark EEU is not PMF-dependent as EEU can occur in the presence of CCCP.

Figure 2C:
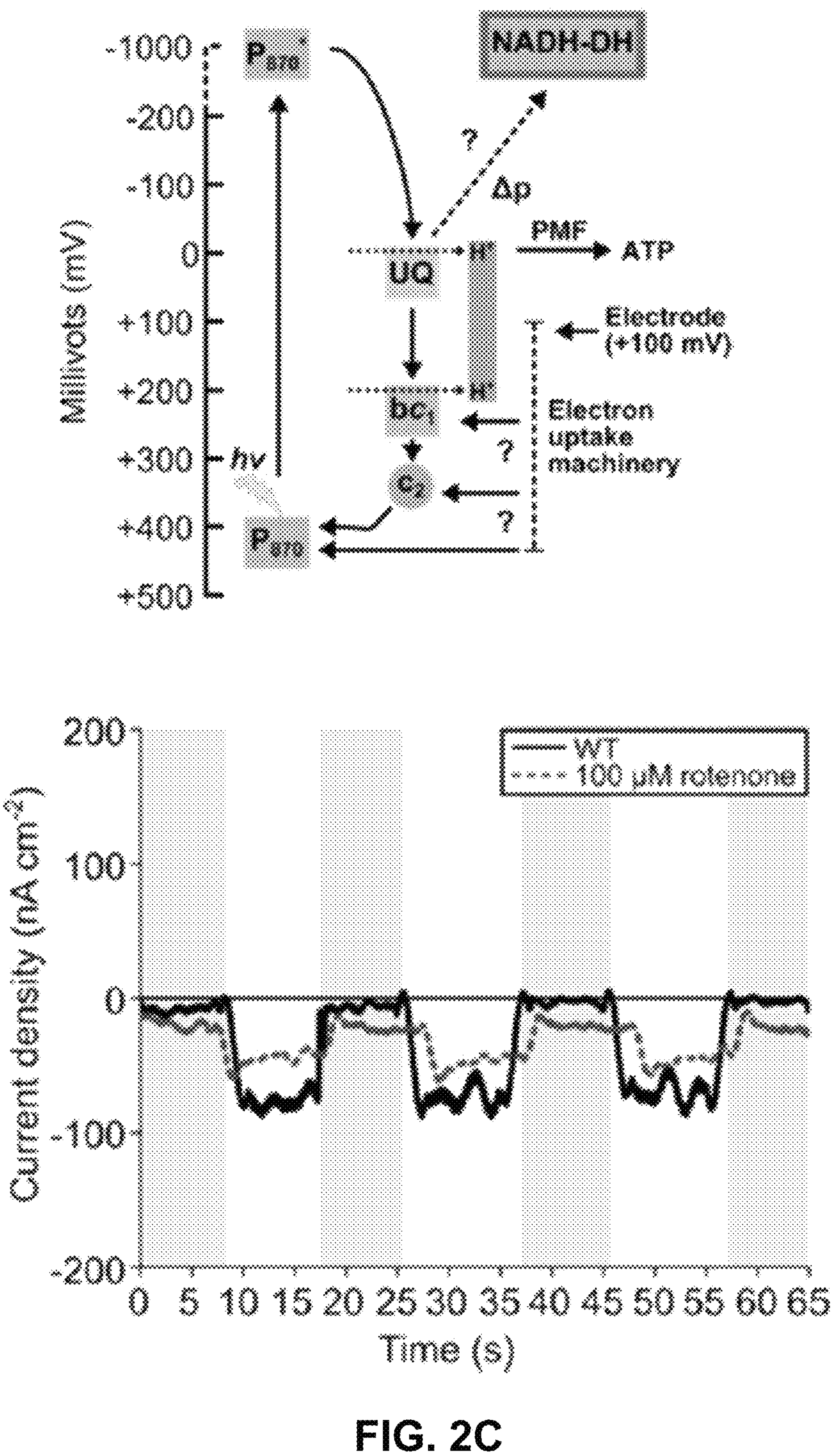
FIG. 2C is a schematic diagram (top) illustrating a proposed path of electron flow (top) and a graph (bottom) summarizing representative current density measurements of TIE-1 wild-type (WT) in response to inhibition of the photosynthetic ETC under illuminated and dark (shaded regions) conditions with and without rotenone. The schematic diagram is annotated similarly to the diagram of FIG. 2A.
Figure 3:
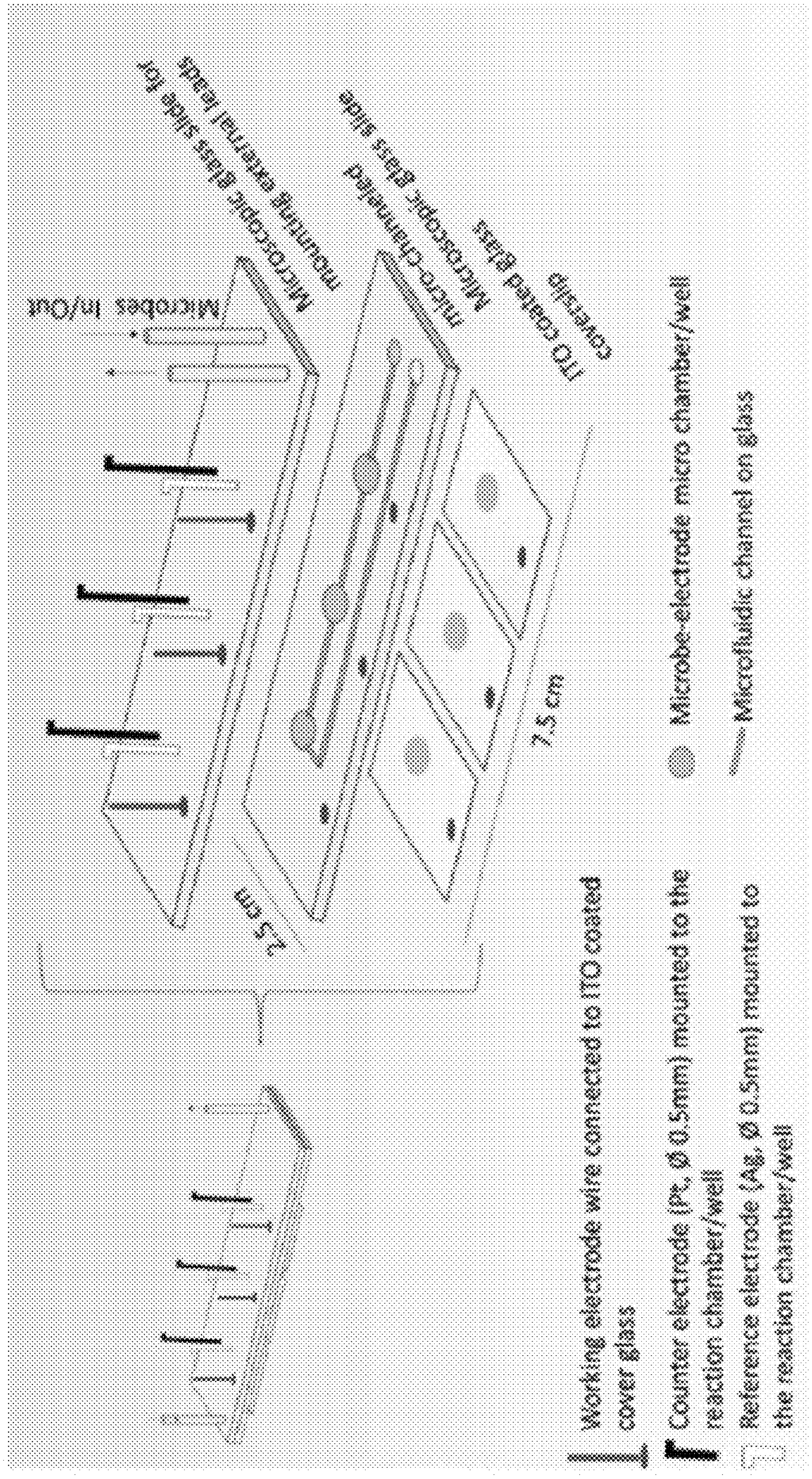
FIG. 3 is a schematic diagram illustrating the microfabrication of a 3-well microfluidic bioelectrochemical device compatible with confocal and super-resolution imaging.
Figure 4:
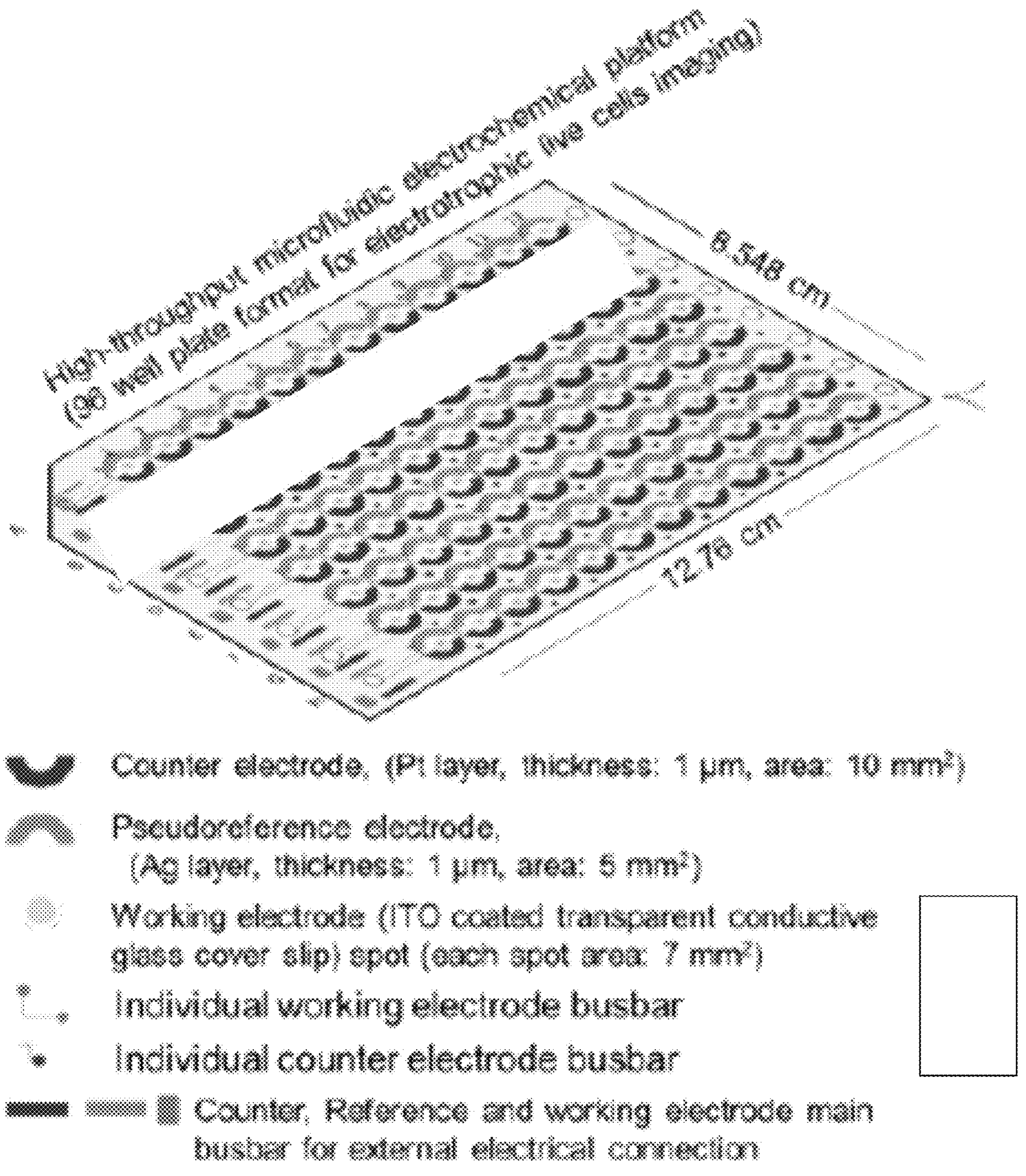
FIG. 4 is a schematic diagram of a 96-well format microfluidic electrochemical system (96-well EC). Pseudo-reference electrode and counter electrode are patterned on glass plates (1 mm thick). The middle layer is a glass cover slip (200 μm thick) with 96 wells for microbe-electrode interface (each well volume ~7 μL). The bottom layer is an ITO coated glass coverslip (170 μm thick).
Figure 5:
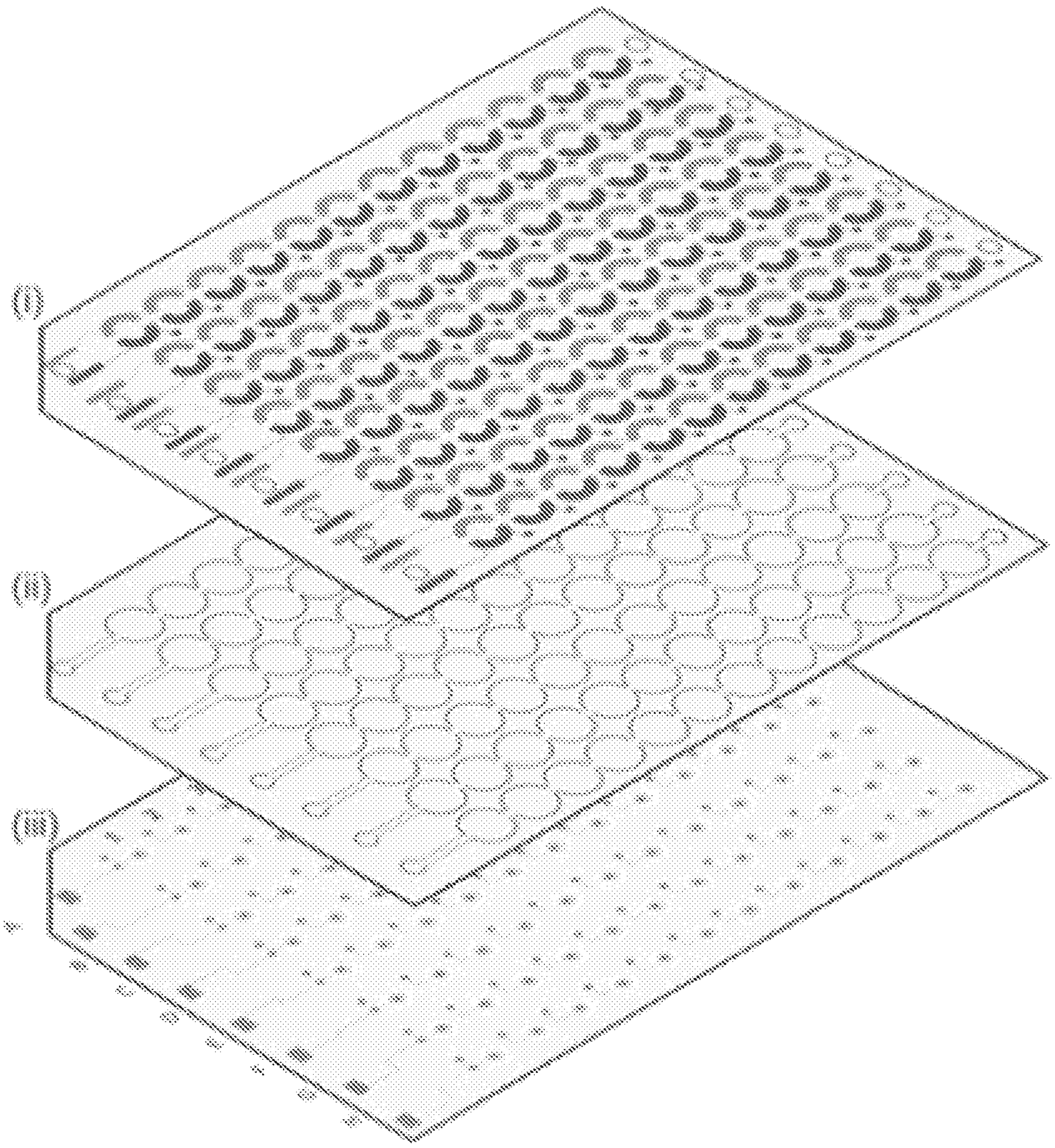
FIG. 5 is a schematic diagram showing the separated layers of the 96-well EC illustrated in FIG. 4.
Figure 6:
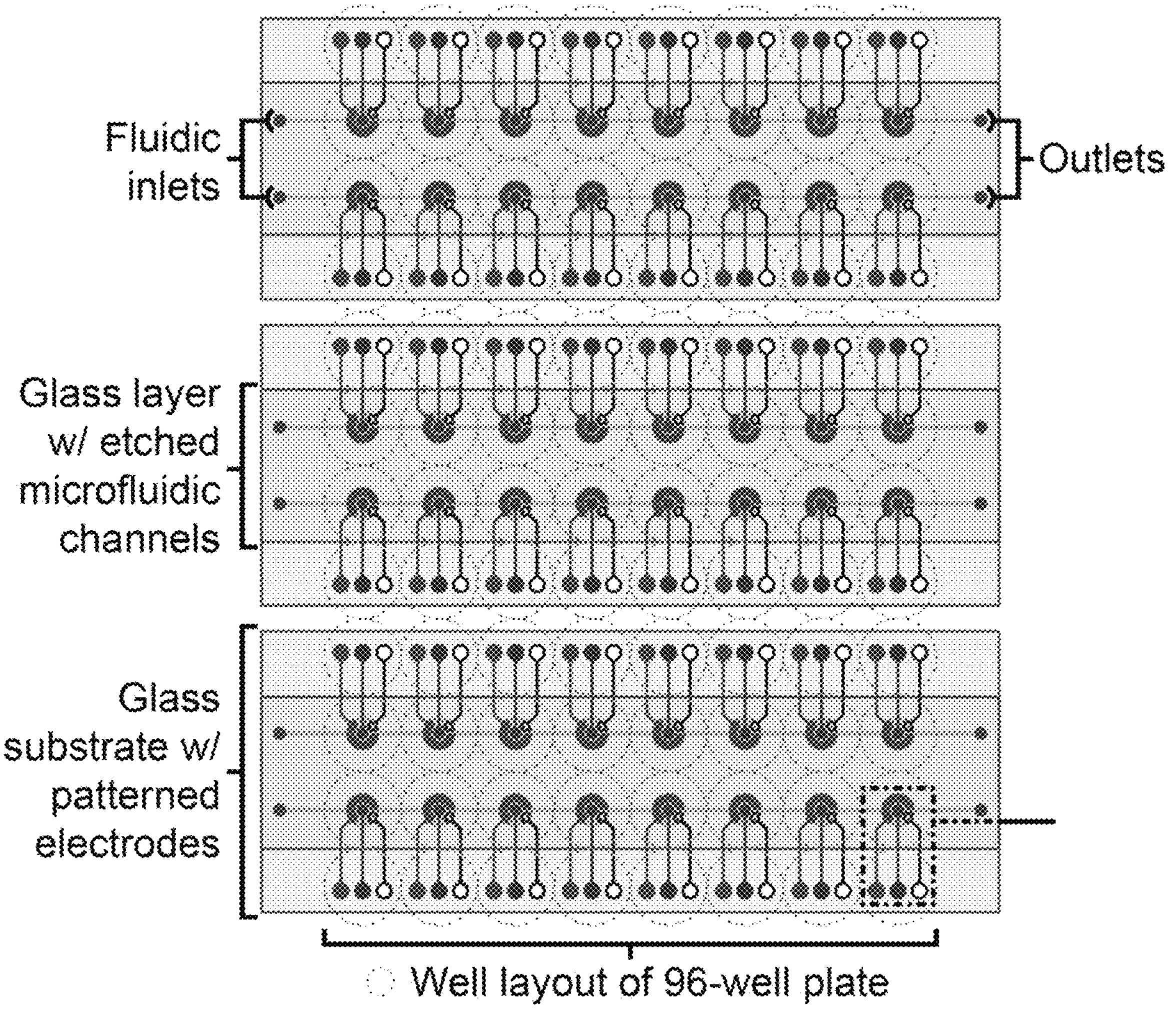
FIG. 6 is a schematic diagram illustrating the arrangements of microfluidic and electrical connections of the 96-well EC device illustrated in FIG. 4.
Figure 7:
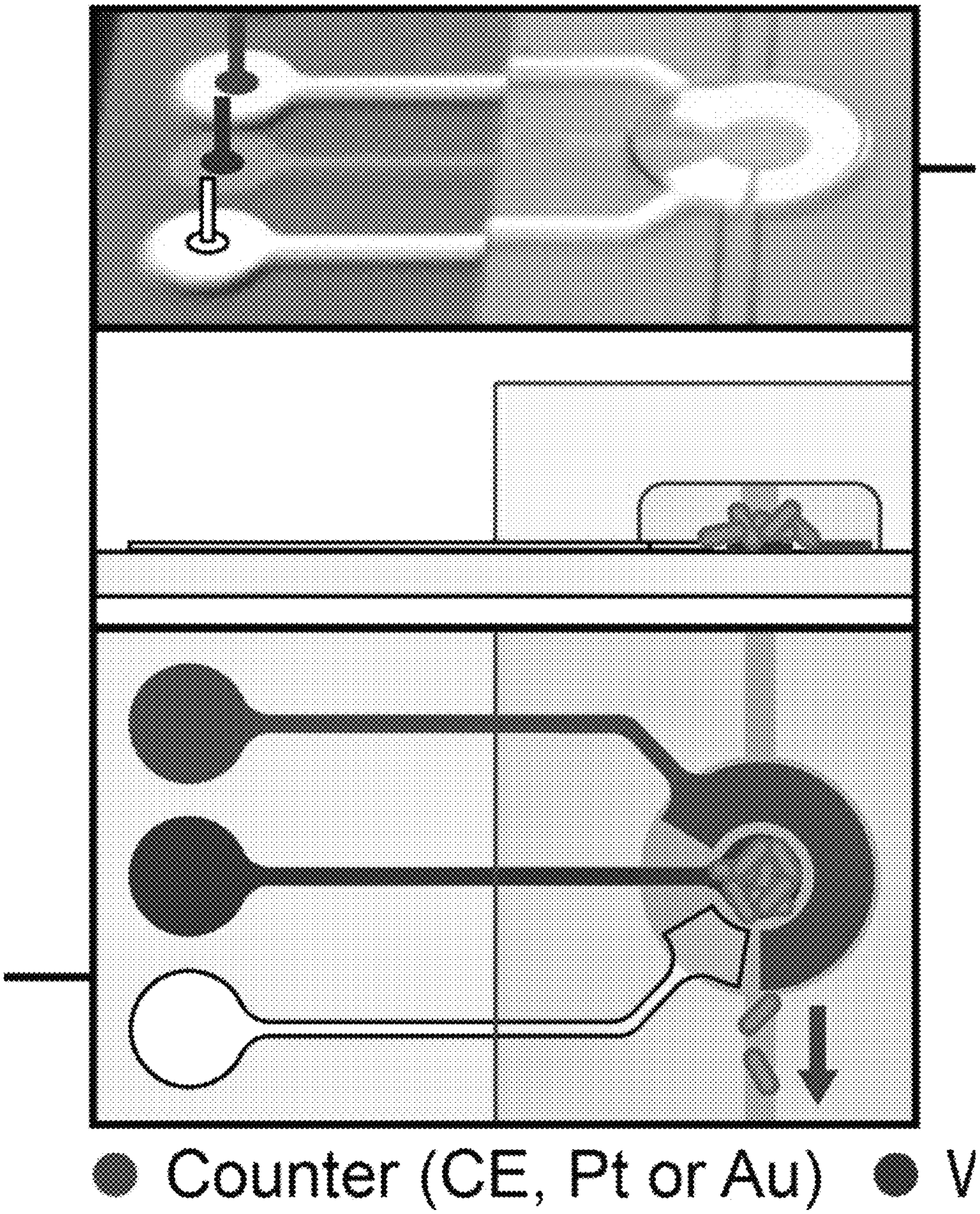
FIG. 7 is a closeup view of one chamber of the device illustrated in FIG. 6.
Figure 8:
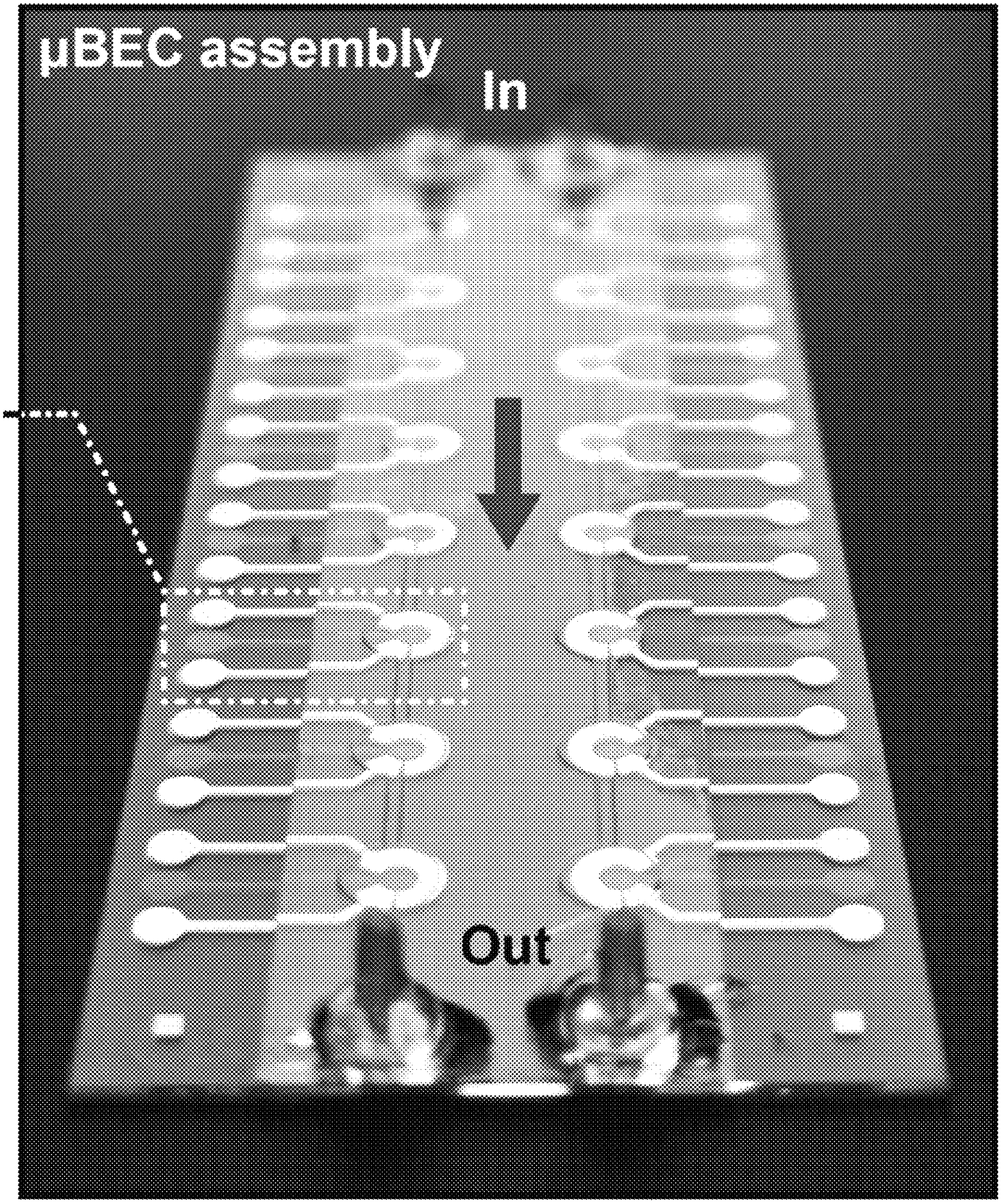
FIG. 8 is a schematic top view of the device illustrated in FIG. 6.

The proton-translocating NADH dehydrogenase oxidizes NADH to generate a PMF for ATP production. NADH dehydrogenase can also function in reverse to catalyze uphill electron transport from the ubiquinone pool to reduce $NAD^+$ in the anoxygenic phototrophs *Rhodobacter capsulatus*[34] and *R. sphaeroides*. Its activity is linked to redox homeostasis and carbon metabolism in these organisms. To investigate whether NADH dehydrogenase has a role in EEU in TIE-1, we treated cells with the NADH dehydrogenase inhibitor rotenone. Rotenone blocks electron transfer from the iron sulfur clusters in NADH dehydrogenase to ubiquinone (FIG. 2*c*). In illuminated biofilms, we observed a ~20% decrease in current uptake with low rotenone concentrations (25 μM; −71.8±2.02 nA $cm^{-2}$; P<0.0001) compared to untreated controls (−94.7±3.61 nA $cm^{-2}$), and up to a ~50% decrease with exposure to high rotenone concentrations (100 μM; −41.6±4.55 nA $cm^{-2}$; P<0.0001) (FIG. 2*c*). The current uptake maxima were markedly lower under these conditions. After initial current uptake, we observed that rotenone-treated cells showed lowered current uptake post light exposure (FIG. 2*c*). It is unclear if this reduction is solely due to lowered current uptake or a combination of both lowered current uptake and increased electron donation to the electrode. The reduction in current uptake could also be a consequence of overreduction of the ubiquinone pool as has been observed in *R. sphaeroides* NADH dehydrogenase mutants. Because we observe only a partial lowering of current uptake with NADH dehydrogenase inhibition (FIG. 2*c*), the cell likely has additional sinks for using reduced ubiquinone.

CCCP and antimycin A treatment both resulted in anodic current generation under illuminated conditions. Although the magnitude of the electrochemical response was different in the two cases, these data suggest that when the pETC is inhibited, TIE-1 cells likely transfer electrons to the poised electrodes by using them as an electron sink. Overall, our inhibitor studies show that (1) electrons enter the pETC of TIE-1 following EEU; (2) PMF is required for light-dependent EEU; (3) cytochrome bc1 is involved in electron flow; and that (4) NADH dehydrogenase plays an important role in EEU.

What is claimed is:

1. A micro-bioelectrochemical cell (μ-BEC) device comprising a plurality of chambers, each chamber enclosing a volume ranging from about 1 μL to about 1.6 μL, the device comprising:
- a support layer, comprising a support contact surface, wherein at least a portion of the contact surface is coated with a working electrode layer;
- a microfluidics layer comprising opposed first and second surfaces and containing a plurality of wells formed therethrough;
- an electrical layer comprising an electrical contact layer, a plurality of counter electrodes positioned on the electrical contact layer and a plurality of reference electrodes positioned on the electrical contact layer;
- wherein:
  - the first surface is bonded to the support contact surface and the second surface is bonded to the electrical contact layer in alignment to form the plurality of chambers, each chamber comprising one well sealed between one portion of the working electrode layer and one portion of the electrical layer containing one counter electrode and one reference electrode the one portion of the working electrode layer, the one counter electrode, and the one reference electrode are in electrical contact with the chamber
  - at least one portion of chambers from the plurality of chambers is microfluidically connected; and
  - the support layer and the working electrode layer are transparent to provide for simultaneous electrochemical measurements and imaging of the volumes enclosed within the plurality of chambers.

2. The device of claim 1, wherein the plurality of chambers ranges from about 12 to about 96 chambers.

3. The device of claim 1, further comprising a plurality of microfluidic channels formed in the second surface of the microfluidics layer between a fluidically connected portion of the plurality of wells.

4. The device of claim 3, further comprising at least one microfluidic inlet and one microfluidic outlet formed in the second surface of the microfluidics layer or the electrical contact surface of the electrical layer, wherein one microfluidic inlet of the at least one microfluidic inlet is connected to the one portion of the plurality of chambers at a receiving chamber of the one portion of the plurality of chambers and one microfluidic outlet of the at least one microfluidic outlet is connected to a delivering chamber of the one portion of the plurality of chambers, wherein the one microfluidic inlet delivers fluids to the one portion of the plurality of chambers and the one microfluidic outlet removes fluids from the one portion of the plurality of chambers.

5. The device of claim 1, wherein the support layer is formed from a material selected from glass, indium tin oxide, and any combination thereof.

6. The device of claim 5, wherein the working electrode layer comprises a material selected from graphite and indium tin oxide (ITO).

7. The device of claim 6, wherein the working electrode layer comprises a continuous ITO layer extending over all wells of the fluidic layer.

8. The device of claim 6, wherein the working electrode layer comprises a plurality of ITO patches, each ITO patch overlapping at least one well of the fluidic layer.

9. The device of claim 1, wherein the electrical layer is formed from glass.

10. The device of claim 1, wherein:

the plurality of reference electrodes are formed from Ag, AgCl, and any combination thereof; and the plurality of counter electrodes are formed from Pt.

11. The device of claim 1, wherein the plurality of reference electrodes and counter electrodes comprise wires positioned within grooves formed within the electrical contact surface of the electrical layer.

12. The device of claim 11, wherein the plurality of reference electrodes and counter electrodes comprise patterned metal deposited on the electrical contact surface of the electrical layer.

13. The device of claim 1, wherein each reference electrode of the plurality of reference electrodes and each counter electrode of the plurality of counter electrodes are in electrical contact with a chamber of the plurality of chambers.

14. The device of claim 13, wherein each reference electrode and each counter electrode are in electrical contact with a group of chambers from the plurality of chambers.

15. The device of claim 1, wherein the microfluidics layer comprises a material selected from glass, acetal polyoxymethylene (POM), and any combination thereof.

16. The device of claim 1, wherein the electrical layer, the support layer, and any combination thereof are transparent for purposes of confocal fluorescence imaging, super-resolution imaging, and any combination thereof.

* * * * *